United States Patent [19]
Baktai et al.

[11] 3,798,008
[45] Mar. 19, 1974

[54] RETENTIVE TUNGSTEN BODY CONTAINING 20–50 PPM TITANIUM AND/OR ZIRCONIUM

[75] Inventors: Gyorgy Baktai; Sandor Saly; Benedek Orlik; Jeno Neugebauer, all of Budapest, Hungary

[73] Assignee: Egyesult Izzolampa es Villamossagi Reszvenytarsasag, Budapest, Hungary

[22] Filed: Sept. 12, 1972

[21] Appl. No.: 288,289

[52] U.S. Cl.......................... 29/182, 75/176, 75/207
[51] Int. Cl........................... C22c 27/00, C22c 1/04
[58] Field of Search ................. 75/176, 207; 29/182

[56] References Cited
UNITED STATES PATENTS

| | | | |
|---|---|---|---|
| 1,030,666 | 6/1912 | Kuzel | 75/207 |
| 3,475,159 | 10/1969 | Hansen | 75/207 X |
| 1,297,000 | 3/1919 | Orance | 75/207 X |
| 1,363,162 | 12/1920 | Myers | 75/176 |
| 1,205,080 | 11/1916 | Baumann | 75/207 |

FOREIGN PATENTS OR APPLICATIONS

| | | | |
|---|---|---|---|
| 1,205,758 | 9/1970 | Great Britain | 75/207 |
| 1,081,756 | 8/1967 | Great Britain | 75/176 |
| 685,276 | 4/1964 | Canada | 75/176 |

*Primary Examiner*—Carl D. Quarforth
*Assistant Examiner*—R. E. Schafer

[57] ABSTRACT

Retentive (shape-retaining) tungsten bodies - e.g., coils - can be manufactured, if the tungsten contains besides the conventional additives /e.g., Si, K, Al etc./ Ti and/or Zr as additional additives in a quantity of the order of magnitude of 20–500 ppm. Such coils sustain their retentivity at high temperatures even for long periods.

3 Claims, No Drawings

RETENTIVE TUNGSTEN BODY CONTAINING 20–50 PPM TITANIUM AND/OR ZIRCONIUM

This invention relates to retentive (shaped-retaining) tungsten bodies — e.g., coils — which contain besides the conventional additives (e.g., Si, K, Al or the these partly substituting Ga, Tl, etc.) Ti and/or Zr as additional additives in a quantity of the order of magnitude of 20–500 ppm. The advantage of such additional additives is that a tungsten body (e.g., coil of incandescent lamps) containing such additives sustains its retentivity (i.e., shape-retaining property) at high temperatures even for long periods.

The abovementioned retentive tungsten coils of the present invention may be used to advantage for special incandescent lamps such as lamps having a halogen filling (halogen lamps), applied e.g., in small-film projectors and similar lamps.

In order to make the present invention clear, the following technical background is given:

Tungsten bodies used in electric incandescent lamps work under very arduous conditions. To ensure long working periods besides the nowadays needed high output these bodies have to have a convenient retentivity and evaporation properties. These properties should be ensured in the up-to-date halogen lamps under even higher temperatures and instead of a neutral gas atmosphere in an atmosphere which attacks tungsten bodies.

Under such working conditions the properties of the usual tungsten bodies having K, Si, Al additives had to be further improved. According to the German Pat. specification No. 1 608 138 the K may be replaced by Tl and thus the arcing of some incandescent lamp types can be reduced.

Additives - in general - have - according to patents describing conventional additives such as the U.S. Pat. Nos. 1 410 499 and 2 012 825 or the Hungarian Pat. No. 155 352 etc. - the following effect:

The additives evaporate to a great extent during the known powder metallurgical manufacturing steps (sintering, mechanical forming, heating) of tungsten due to the temperatures used, and thus in the conventional so-called GK-type metals (having e.g., a K, Si, Al content) not more than 20 ppm of such additives remain. The crystallization of the metal, however, is influenced by the transformations which remain at the location of the evaporated additive plus the residual additives, whereby the properties (e.g. the retentivity) of the metal is determined by the residual additives. The residual quantity of the additives and their effect may decrease, however, in a great manner at the working temperature (2,400°–3,000° C) of the coils; moreover, in the presence of aggressive (corrosive) gases this decrease takes place even at lower temperatures.

Due to this fact, the coil changes its properties step by step during its working life, and this can lead to the early deterioration (break-down) of the lamp.

A further drawback is that due to the evaporation of the largest part of the K, Si, Al additives, the distinguishing of this tungsten type from other ones may lead to difficulties during manufacturing.

The present invention has among its objects the overcoming of the above-mentioned drawbacks.

It has been found that the retentivity of tungsten coils as well as the useful life of the lamps may be assured even at high working temperatures by using, besides the residual traces of the conventional additives (K, Si, Al) or other additives substituting these (e.g., Ga, Tl) not amounting to more than about 20 ppm, an additional additive or additives selected from the group of Ti and Zr in a quantity of 20–500 ppm. The Ti and/or Zr may be incorporated into the tungsten during the course of the preparation process usual in the powder metallurgical manufacture of tungsten metal in such a way that the residual quantity of Ti and/or Zr should be - when measured after having mechanically worked said metal - greater or at least equal to the residual traces of the usual additives (K, Al, Si), which is about 20 ppm. The ratio of the residual traces of Ti + Zr to the K + Si + Al can vary between 1 to 10.

We have found that coils manufactured out of tungsten having the said additional additives built into known halogen lamps retained their original shape even after a few thousand hours of burning, whilst in lamps having coils made out of the conventional tungsten (not containing additional additives) the sagging of the coils can be observed after a few hundred working hours.

The invention is based on the recognition that besides the conventional additives such additional additive or additives have to added to the tungsten which remain in the tungsten in a quantity of at least 80 percent of the original one in a pseudomorph arrangement after the quantity of the conventional additives has diminished or they have become inactive even after a few thousand working hours of the lamp and thus ensure in a lasting manner the required mechanical physical properties even at high temperatures.

It has been found that in case of halogen lamps having especially increased requirements, e.g., a Ti content of 50–200 ppm, and in the case of the usual incandescent lamps a smaller quantity e.g., 20 ppm Ti produces the most fast tungsten body for the above described purpose.

This relatively small e.g., 20 ppm Ti content is also sufficient to ensure the sure distinguishing of such tungsten bodies from other ones not containing Ti or containing it in a higher quantity in any stage of manufacture or the end product, by means of spectral analysis.

The invention is illustrated by way of the following Examples:

EXAMPLE 1

Tungsten oxide produced in a manner known per se - e.g., by the decomposing of ammoniumparatungstate - and containing as additives 0.2 percent K, 0.15 percent Si and 0.02 percent Al, having an ignition loss of 0.7 percent is mixed with a $TiCl_3$ solution equivalent to 0.02 percent Ti. The material is dried during mixing and is heated thereafter to 300° C. This is followed by the reduction of the powder to metal - in a manner known per se - in a $H_2$ gas stream at a temperature not higher than 850° C. The metal powder thus produced is then - also in a manner known per se - pressed into bars and sintered at 94 percent of the melting current (current needed to melt the bar).

In the sintered body 180 ppm Ti and about 20—20 ppm K, Si and Al can be found, the ratio of Ti/K + Si + Al being about 3.

Coils manufactured in a known manner out of this sintered body are built into 280 V 5000 W type halogen incandescent lamps. The coil does not change in a measurable manner its form (shape) during the nominal lifetime of the lamp and the weight-loss due to evaporation of said coil is smaller by at least 1 percent than that of conventional coils.

EXAMPLE 2

The coil manufactured according to Example 1 is built into a 220 V, 150 W projector non-halogen lamp. The properties of the coil during working of the lamp are practically similar to that described in Example 1.

EXAMPLE 3

The tungsten oxide according to Example 1 is prepared instead of Ti compound with zirconicumnitrate corresponding to 0.01 percent Zr, thereafter similar coils and lamps are manufactured as described in Examples 1 and 2. The property of these coils is practically the same as in the above-mentioned Examples.

EXAMPLE 4

The tungsten oxide according to Example 1 is prepared with $TiCl_3$ corresponding to 0.02 percent Ti plus zirconicumnitrate corresponsing to 0.002 percent Zr, thereafter similar coils and lamps are manufactured as described in Examples 1 and 2 with similar results.

EXAMPLE 5

The tungsten oxide according to Example 1 is prepared with $TiCl_3$ corresponding to 0.002 percent Ti, thereafter in a known manner 220 V 40 W coils are manufactured from the same. The semi-products (rod wire) and the coil can be identified easily during manufacturing by spectographic methods and can be distinguished from tungsten types manufactured with other additive components or from those having a higher Ti content, manufactured for the purposes of halogen lamps.

Having illustrated the invention by way of Examples some test results can further illustrate the advantageous properties of the Ti and/or Zr tungsten bodies:

| Tensile strength $\sigma_B$ kg/mm² | Measured on Ti, Zr containing tungsten wires (dia.: 0.185 mm) | Measured on Ti, Zr free tungsten wires (dia.: 0.185 mm) |
| --- | --- | --- |
| at room temperature | 299 | 290 |
| at 1850°C | 7.92 | 8.42 |
| Elongation % | | |
| at room temperature | 3.4 | 2.7 |
| at 1850°C | 30.8 | 22.5 |

With the material manufactured according to the invention the large part of the elongation occurs at the largest ultimate tensile load which is favourable in respect of the high temperature retentivity. A further advantage of the coil according to the invention is that in case of a quick heating up - above a temperature of 2,400°C - it evaporates considerably less then the conventional tungsten materials. This behaviour is even more pronounced in case of a heating in a carbon-containing atmosphere. This has a special importance if the halogen component is introduced into the lamp in the form of halogenized hydrocarbons.

What we claim is:

1. A sintered tungsten body containing conventional additives selected from the group of K, Si, Al, Ga, Tl adapted for the manufacturing of high temperature retentive incandescent coils characterized by containing at least one additional additive selected from the group consisting of Ti and Zr in a quantity of 20–500 ppm.

2. A tungsten body as claimed in claim 1, wherein said total additional additives amount to 20–500 ppm.

3. A tungsten body as claimed in claim 2, wherein the ratio of the total amount of said additional additives to the total amount of the conventional additives is between 1 to 10.

* * * * *